United States Patent
Chambers et al.

(10) Patent No.: US 7,105,584 B2
(45) Date of Patent: Sep. 12, 2006

(54) DUAL-CURE SILICONE COMPOUNDS EXHIBITING ELASTOMERIC PROPERTIES

(75) Inventors: Brian R. Chambers, Mantua, OH (US); Steven L. Hannah, Chagrin Falls, OH (US); Ronald J. Raleigh, Jr., Westlake, OH (US)

(73) Assignee: NSCG, Inc., Cleveland, OH (US)

( * ) Notice: Subject to any disclaimer, the term of this patent is extended or adjusted under 35 U.S.C. 154(b) by 107 days.

(21) Appl. No.: 10/823,942

(22) Filed: Apr. 14, 2004

(65) Prior Publication Data

US 2004/0209972 A1    Oct. 21, 2004

Related U.S. Application Data

(60) Provisional application No. 60/463,854, filed on Apr. 18, 2003.

(51) Int. Cl.
    *C08F 2/46*    (2006.01)
    *C08G 77/04*   (2006.01)
    *C08G 77/26*   (2006.01)

(52) U.S. Cl. ............................ 522/99; 528/30; 528/32; 528/33

(58) Field of Classification Search ............... 528/33; 522/99
    See application file for complete search history.

(56) References Cited

U.S. PATENT DOCUMENTS

| | | | |
|---|---|---|---|
| 3,592,795 A | 7/1971 | Ashby | |
| 3,661,744 A | 5/1972 | Kehr et al. | |
| 3,816,184 A | 6/1974 | Redmore et al. | |
| 3,933,712 A | 1/1976 | Vanaglash, Jr. | |
| 4,017,495 A | 4/1977 | Jaffe et al. | |
| 4,052,529 A | 10/1977 | Bokerman et al. | |
| 4,064,027 A | 12/1977 | Gant | |
| 4,070,526 A | 1/1978 | Colquhoun et al. | |
| 4,072,635 A | 2/1978 | Jeram | |
| 4,087,585 A | 5/1978 | Schulz | |
| 4,107,390 A | 8/1978 | Gordon et al. | |
| 4,197,173 A | 4/1980 | Curry et al. | |
| 4,201,808 A | 5/1980 | Cully et al. | |
| 4,279,717 A | 7/1981 | Eckberg et al. | |
| 4,290,869 A * | 9/1981 | Pigeon | 428/438 |
| 4,348,454 A | 9/1982 | Eckberg | |
| 4,374,967 A | 2/1983 | Brown et al. | |
| 4,399,267 A * | 8/1983 | Bosch et al. | 528/30 |
| 4,526,955 A * | 7/1985 | Bennington et al. | 522/172 |
| 4,528,081 A | 7/1985 | Lien et al. | |
| 4,572,918 A * | 2/1986 | Lee et al. | 521/91 |
| 4,675,346 A | 6/1987 | Lin et al. | |
| 4,946,874 A | 8/1990 | Lee et al. | |
| 4,952,711 A * | 8/1990 | Jacobine et al. | 522/99 |
| 5,124,212 A | 6/1992 | Lee et al. | |
| 5,162,389 A | 11/1992 | Lee et al. | |
| 5,169,879 A | 12/1992 | Lee et al. | |
| 5,348,986 A * | 9/1994 | Chu et al. | 522/37 |
| 5,990,223 A * | 11/1999 | DeGroot, Jr. | 524/492 |
| 6,384,125 B1 * | 5/2002 | Bergstrom et al. | 524/492 |
| 6,451,870 B1 * | 9/2002 | DeCato et al. | 522/99 |
| 2003/0195290 A1 * | 10/2003 | Scholz et al. | 524/493 |

* cited by examiner

*Primary Examiner*—Susan Berman
(74) *Attorney, Agent, or Firm*—Pearne & Gordon LLP

(57) ABSTRACT

A dual-cure silicone composition is provided that is useful to make an encapsulating/potting compound. The dual-cure silicone exhibits both UV- and moisture-initiated curing mechanisms, with the UV-initiated curing mechanism providing very rapid curing compared to conventional dual-cure silicones. The dual-cure silicone is an elastomeric material on curing. In a preferred embodiment, the dual-cure silicone composition is made from a mixture of a first polysiloxane component having terminal mercapto and alkoxy functionality, and a second polysiloxane component having terminal vinyl and alkoxy functionality. Methods of making the first and second polysiloxane components also are disclosed.

27 Claims, No Drawings

DUAL-CURE SILICONE COMPOUNDS EXHIBITING ELASTOMERIC PROPERTIES

This application claims the benefit of U.S. Provisional Patent application Ser. No. 60/463,854 filed Apr. 18, 2003.

BACKGROUND OF THE INVENTION

This invention relates to the curing of polysiloxane (silicone) compositions, which are particularly well suited for application as electronic potting compounds, and coatings.

Potting materials, regardless of the chemistry, are used for sealing electrical connectors, temperature probes and sensors in applications throughout the aerospace, defense, electronic, electrical, industrial, and marine industries. Potting compounds and encapsulants provide vibration and shock resistance, corrosion protection and thermal stress protection to sensitive electronic components. These materials range in character from very hard, rigid thermoset epoxies to soft, "gel-like" silicones. U.S. Pat. Nos. 3,933,712 and 4,374,967 give a more extensive description of silicone gels. Due to their superior moisture resistance, thermal stability, cold temperature flexibility and dielectric strength, silicone based products are used extensively in the electronics industry as potting and encapsulating compounds on integrated circuit boards.

Conformal coatings, which are similar in composition to the potting and encapsulating materials, protect integrated circuit boards, and other system components from damage which may happen during fabrication, shipping and handling. Currently, silicone RTV's (room temperature vulcanization) provide satisfactory coatings. These materials, which cure when exposed to atmospheric moisture, are commercially available and well known in the art. Further information and examples of these systems are found with reference to the following U.S. Pat. Nos. 4,017,495; 3,816,184 and 3,592,795. However, moisture-cured RTV's are generally slow, requiring at best several hours, but often several days to reach full strength. U.S. Pat. No. 4,087,585 describes a two-component system which yields faster cure times if elevated temperatures are provided. Two-component products frequently require specialized mixing equipment, and extraordinary cure conditions. This adds a level of complexity to the fabrication process, which generally increases the cost of production.

A dual-cure silicone composition is provided having a first polysiloxane component and a second polysiloxane component, wherein the first polysiloxane component is selected from the group consisting of: a) polyorganosiloxanes having terminal mercapto and alkoxy functionality, and b) dimethylmercapto terminated polydimethylsiloxanes; and wherein the second polysiloxane component is selected from the group consisting of: a) polyorganosiloxanes having terminal vinyl and alkoxy functionality, b) vinylmethylsiloxane copolymers that are trimethyl terminated and have vinyl functionality pendent to the polymer backbone, and c) dimethylvinyl terminated polydimethylsiloxanes.

DETAILED DESCRIPTION OF THE PREFERRED EMBODIMENTS OF THE INVENTION

As used herein, when a range such as 5–25 (or 5 to 25) is given, this means preferably at least 5 and, separately and independently, preferably not more than 25. Also as used herein, the term oligomer refers to a polymer chain having three or more linked monomeric units. As will become apparent, the individual monomers in the oligomers described herein generally are all modified siloxanes (e.g. dimethyl siloxane, vinyl siloxane, aryl siloxane, etc.). However, as will also become apparent, in this definition of oligomer it is not necessary, or even preferred, that all monomeric units in the polymer chain are the same exact monomer. The notation "cps" used herein means centipoises. Also as used herein, the term 'composition' refers to a mixture of individual polysiloxane components, among other components that may be present, prior to curing. The term 'compound' refers to the cured structure produced through reacting (cross-linking) the individual polysiloxane components present in the composition.

The invention provides a novel dual-cure silicone composition that exhibits substantially improved elastomeric properties compared to conventional dual-cure silicones. A dual-cure silicone, as used herein, refers to a silicone composition that incorporates two distinct cross-linking or vulcanization (curing) mechanisms. In the dual-cure silicone composition of the present invention, the first curing mechanism is a UV-generated free radical-induced polymerization mechanism, and the second is a moisture-induced polymerization mechanism, both of which are described more fully below. Thus, the silicone compositions according to the invention can be broadly characterized in that they incorporate both UV- and moisture-initiated curing mechanisms, and also in that the resulting silicone materials, made by curing the compositions according to the invention, exhibit good elastomeric properties that can be tuned to meet a particular application as will be fully explained.

The dual-cure silicone compounds according to the invention are made by cross-linking (curing) two distinct telechelic polysiloxane oligomers, respectively referred to herein as the first polysiloxane component and the second polysiloxane component, which are provided together in the uncured dual-cure compositions. As used herein, a telechelic oligomer refers to a terminally functional linear oligomer, meaning the oligomer has at least one functional group at a terminal end thereof, preferably at either terminal end as will become apparent. Examples of functional groups include, but are not limited to, vinyl, mercapto, alkoxy, oximo, and silanol, groups.

Each of the first and second polysiloxane components and preferred methods of making them will now be described. Subsequently, methods and ratios for combining the first and second polysiloxane components, as well as other components, also will be described.

Beginning with the first polysiloxane component, this component is a linear polyorganosiloxane having, at at least one terminal end, both mercapto and alkoxy functionality. Most preferably, the first polysiloxane component has terminal mercapto and alkoxy functionality at both ends of the molecule as shown in Formula (1) below in order to promote cross-linking as will be explained.

(1)

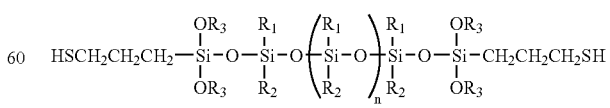

It is known in the art that silicone polymers containing acrylic and methacrylic functionality will cure upon exposure to an ultra-violet (UV) light source. Described in U.S. Pat. Nos. 4,201,808 and 4,348,454 are silicone release coatings cured through the aforementioned mechanism. The described compositions do not produce elastomeric materials. U.S. Pat. No. 4,675,346 describes elastomeric, silicone rubber compositions containing "acrylic groups" that are cured through photoinitiated, free-radical polymerization. Products based upon this type of chemistry are commercially available, require no mixing, and are relatively fast curing. Materials that rely strictly on a UV cure mechanism suffer from one serious drawback; the composition will never cure in any area where the UV light source does not shine. U.S. Pat. No. 4,528,081 details a dual-curing silicone composition. These materials incorporate a secondary cure mechanism, in addition to the photoinitiated polymerization, to provide shadow cure in areas which are not accessible to UV irradiation.

Two additional UV-curable silicone systems have been developed: epoxy-silicone systems and mercapto/alkenyl functional systems. Epoxy-silicone systems, such as those described in U.S. Pat. No. 4,279,717, cure very quickly, but the raw materials are extremely expensive and not widely available. Many mercapto-functional silicone systems are known, which yield serviceable release coating compositions. For example, U.S. Pat. Nos. 4,064,027; 4,107,390; 4,197,173; 3,661,744; 4,070,526 and 4,052,529 disclose mercapto-functional, or polythiol compounds which when combined with vinyl functional organic compounds and a photosensitive initiator will cure upon UV exposure. Formulations based upon these chemistries generally provide very thin film coatings with poor elastomeric properties. As a coating for optical fibers, U.S. Pat. Nos. 5,169,879; 5,162,389; 5,124,212 and 4,946,874 outline UV curable, silicone compositions having a high refractive index that are made by mixing an alkenyl-functional polydiorganosiloxane, a mercapto-functional crosslinker and a photosensitizer. Again, these materials generally provide very thin film coatings with poor elastomeric properties. All of the aforementioned mercapto/alkenyl based systems rely strictly upon the ultra-violet radiation to activate the photoinitiator, which initiates polymerization and thereby cures the coating. There is no secondary cure mechanism available to shadow cure any areas that are not accessible to the UV irradiation. As mentioned earlier, this presents a problem with complicated constructions with multiple components that stand proud of (stand above) the circuit board and block the radiation.

By terminal, it is meant that the described functionality is provided in a region adjacent a terminal end of the telechelic oligomer, in this case the first polysiloxane component. The word terminal is not intended to limit the described functionality to being located exactly at the end of the molecule. It is envisioned a terminal region of a telechelic oligomer as described herein may encompass about 2–8, preferably 2–5, linking units from an end of the molecule depending on the overall length (value for n in Formula (1)) of the molecule, the linking units being either carbon or silicon atoms. For large molecules (large values of n), the terminal region may be larger. In Formula (1), $R_1$, $R_2$ and $R_3$ each is preferably an organo group, preferably an alkyl group such as methyl, ethyl, etc. Less preferably, $R_1$, $R_2$ and $R_3$ each can be an aryl group such as benzyl or phenyl, or a halogenated alkyl group such as 3,3,3-trifluoropropyl. It is not necessary that $R_1$, $R_2$ and $R_3$ each be the same structure. It is preferred that $R_1$ and $R_2$ be alkyl groups, most preferably methyl. As mentioned above, $R_1$ and $R_2$ also can be phenyl groups, however high phenyl content silicones may absorb in the UV region, and therefore may reduce through cure efficiency of the final dual-cure silicone composition which is the reason they are less preferred. For optimum moisture cure speed and efficiency, $R_3$ most preferably is an alkyl group, preferably either methyl or ethyl.

The degree of polymerization represented by n in Formula (1) is greater than about 50 to achieve the desired properties in the final cured dual-cure silicone compound (described below). While there is no technical upper limit for n, values greater than about 1500–2000 generally are not practically obtained (though they may be obtained at additional expense and effort unnecessary for the present invention).

The first polysiloxane component preferably is made as a reaction product of a silanol terminated polyorganosiloxane as shown in Formula (2), and a mercapto-functional silane coupling agent (Formula (3)) in the presence of a suitable condensation catalyst such as an organotitanate. As seen below in Formula (3), the silane coupling agent preferably is in the form of a mercapto-functional tri-alkoxysilane. Of necessity, the $R_1$ and $R_2$ groups in Formula (2) and the $R_3$ groups in Formula (3) each are defined as the respective group is defined above in Formula (1), because the R-side groups of the molecules illustrated in Formulas (2) and (3) are the same as (i.e. the source of) the analogous side groups in the reaction product of these molecules; i.e. Formula (1). The value for n in Formula (2) is similarly defined as that in Formula (1) above for the same reasons.

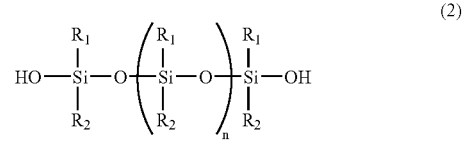

(2)

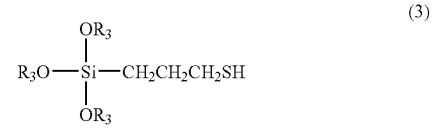

(3)

The reaction of the silanol terminated polyorganosiloxane with the mercapto-functional silane coupling agent (Formulas (2) and (3) respectively) to produce the first polysiloxane component (Formula (1)) preferably is carried out as follows. A stoichiometric excess of the mercapto-functional coupling agent is reacted with the silanol terminated polyorganosiloxane at a temperature in the range of 20° C. to about 50° C. for a period of about 30 minutes up to about 2 hours under at least a modest vacuum (preferably 740, 720, 710 or 700, mmHg, or lower). It will be evident that the above reaction exhibits a 2:1 stoichiometric ratio of mercapto-functional:silanol-terminated species. Running this reaction at a stoichiometric excess of the mercapto-functional species has yielded good results in terms of producing complete mercapto-functional species addition onto both ends of the silanol terminated polyorganosiloxane. Preferably, the mercapto-functional species is provided in a tenfold stoichiometric excess yielding a total ratio of 20:1. Ratios of lesser magnitudes also can be used, e.g. at least a 16:1, less preferably 8:1, less preferably 4:1, molar ratio, the key being to provide a sufficient quantity of the mercapto-functional species to fully substitute onto both of the terminal hydroxyl groups on the silanol terminated species of Formula (2). The reaction is endothermic and proceeds at a faster rate with increased temperature. However, above about 50° C. the mercapto-functional monomer is subject to evaporation and the reaction (particularly the reactant stoichiometric ratios) becomes difficult to control reliably. It will be evident the above reaction is a condensation reaction, yielding a volatile alcohol of the form $R_3OH$ as a byproduct, which is why the reaction preferably is carried out under vacuum—to volatilize and remove the alcohol product and consequently to drive the reaction toward product formation as much as possible. However, substantial vacuum, especially at temperatures approaching 50° C., also can contribute to vaporization of the mercapto-functional monomer and care must be taken to balance reaction temperature with vacuum pressure so as not to vaporize the monomer. Once the reaction is complete, the resulting mixture contains a quantity of the generated first polysiloxane component, as well as the unreacted excess mercapto-functional coupling agent. It has been found this excess mercapto functional material is not detrimental to the finished (cured) dual-cure silicone compound, and generally no effort is made to remove this excess.

The molecular weight of the first polysiloxane component determines the viscosity, among other physical properties, as well as certain as-cured characteristics (such as elasticity) of the final (cured) dual-cure silicone compound. The molecular weight of the first polysiloxane component is controlled substantially by the molecular weight of the silanol terminated species of Formula (2). Depending on the desired physical properties, silanol terminated silicone polymers having viscosities in the range of 100 cps to 80,000 cps may be employed. If the dual-cure silicone compound of the invention is to be used as a coating or encapsulating compound, the silanol-terminated silicone polymer used to make the first polysiloxane component most preferably has a viscosity in the range of 100 cps and 5000 cps, most preferably in the range of 2000–5000 cps. Conversely, the mercapto terminated species of Formula (3) typically has a molecular weight less than 1000, typically in the low 100's range. Because of the substantial disparity between the molecular weights of these molecules, it is in practice somewhat difficult to maintain very accurate stoichiometric ratios between them; one mole of the species of Formula (2) may be one or several orders of magnitude heavier than one mole of Formula (3). Therefore, the above-noted preferred stoichiometric ratios are nominal ratios, and are not intended to be exact.

In a further embodiment of the invention, the first polysiloxane component can be a dimethylmercapto terminated polydimethylsiloxane. In this embodiment the first polysiloxane component exhibits no alkoxy functionality. The aforementioned mercapto terminated siloxanes are commercially available, e.g., as KF-2001 from Shin-Etsu Chemical Co., Ltd., in a range of viscosities.

The second polysiloxane component also is a linear polyorganosiloxane, but differs from the first polysiloxane component in that it is terminated at at least one, preferably each, end with both vinyl and alkoxy functionality as shown in Formula (4) below.

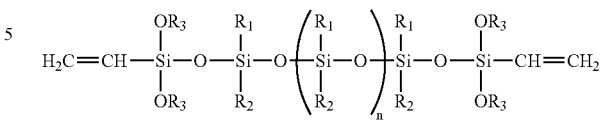

$R_1$, $R_2$, $R_3$, and n in the second polysiloxane component of Formula (4) are each defined respectively the same as described above for the first polysiloxane component of Formula (1).

Preferably, the second polysiloxane component is prepared as a reaction product of the silanol terminated polyorganosiloxanes represented by Formula (2) above, and a vinyl-functional silane coupling agent as shown below in Formula (5) in the presence of a suitable condensation catalyst such as an organotitanate. As shown in Formula (5), the vinyl-functional silane coupling agent is a vinyl-functional tri-alkoxysilane. In Formula (5), $R_3$ is defined similarly as the respective group in Formula (1).

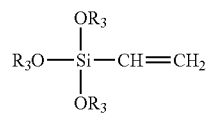

Preferably, the silanol terminated polyorganosiloxane and the vinyl-functional tri-alkoxysilane just described are reacted to produce the second polysiloxane component (Formula (4)) under similar reaction conditions as described above for producing the first polysiloxane component. This is because, like the reaction to form the first polysiloxane component, this second reaction also is a condensation reaction whereby a functional molecule (vinyl-functional tri-alkoxysilane) is added in a stoichiometric ratio of 2-to-1 to a bi-silanol-terminated polyorganosiloxane to provide the vinyl functionality at both ends of the polyorganosiloxane. This reaction yields a similar volatile alcohol byproduct and proceeds in a similar manner as that already described as will be apparent to persons skilled in the art. Similarly as in the first above-described reaction, the vinyl functional species preferably is provided in a stoichiometric excess, preferably at least a 4-, 8-, 12-, 16-, or 20-fold excess in order to drive the reaction toward products. Also similarly, this results in the product mixture containing a quantity of the generated second polysiloxane component, as well as the unreacted excess vinyl-functional coupling agent. It has also been found this excess vinyl-functional material is not detrimental to the finished (cured) dual-cure silicone compound, and generally no effort is made to remove this excess.

Like the first polysiloxane component, the molecular weight of the second polysiloxane component also is controlled substantially by the molecular weight of the silanol terminated species of Formula (2). The viscosity for the second polysiloxane component preferably is selected similarly as for the first polysiloxane component. Most preferably, both the first and second polysiloxane components are made from the same silanol terminated siloxane (Formula (2)), so they will have similar viscosities. However, this is not required.

Alternatively, in a further embodiment the second polysiloxane component can be a linear polyorganosiloxane having terminal vinyl and oximo functionality at at least one, but preferably at each, end as shown below in Formula (6). In Formula (6), $R_1$ and $R_2$ each is defined as in the first polysiloxane component of Formula (1) above. $R_4$ in Formula (6) is of the form —N═$CR_5R_6$ such that the O—$R_4$ linkage creates an oximine (O—N═C) structure. $R_5$ and $R_6$ preferably are low order alkyl moieties, e.g. $C_1$–$C_5$, preferably $C_1$–$C_2$, and most preferably $R_5$ is methyl and $R_6$ is ethyl. Alternatively, $R_5$ and $R_6$ can be methyl and isobutyl respectively.

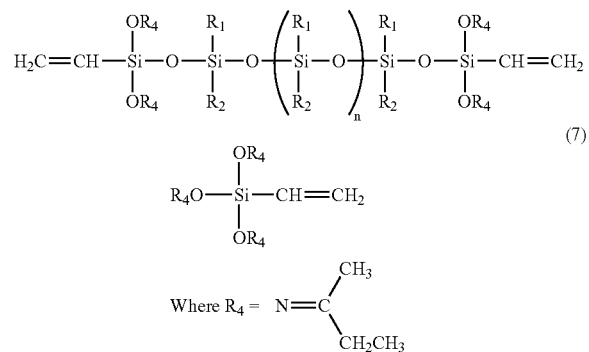

There is a need in the art for dual-cure silicone elastomers that can be formulated to function as coatings, encapsulants, gels and potting compounds, and which cure quickly and reliably on UV exposure. Preferably, such an elastomeric compound has a secondary moisture-activated cure mechanism for improved shadow curing, and is made from readily available and relatively inexpensive raw materials.

SUMMARY OF THE INVENTION

A dual-cure silicone composition is provided having a first polysiloxane component and a second polysiloxane component, wherein the first polysiloxane component is a polyorganosiloxane having terminal mercapto and alkoxy functionality, and the second polysiloxane component is a polyorganosiloxane having terminal vinyl and alkoxy functionality.

A dual-cure silicone composition is provided that exhibits both a UV-initiated crosslinking mechanism and a moisture-initiated crosslinking mechanism, wherein a layer of the composition having a uniform total thickness of 0.1 inches exhibits at least 70 percent total curing, based on the UV-initiated curing mechanism, following two seconds of exposure to direct UV radiation having an average UV intensity of 151–185 mW/cm² measured at the surface of the layer.

A dual-cure silicone composition is provided having a first polysiloxane component and a second polysiloxane component, wherein the first polysiloxane component is a polyorganosiloxane having terminal mercapto and alkoxy functionality, and the second polysiloxane component is a polyorganosiloxane having terminal vinyl and oximo functionality.

A silicone composition is provided that is made from crosslinking a first polysiloxane component and a second polysiloxane component. The first polysiloxane component is a polyorganosiloxane having terminal mercapto functionality, and the second polysiloxane component is a polyorganosiloxane having terminal vinyl functionality. The resulting silicone compound is elastomeric.

Preferably, the second polysiloxane component having terminal oximo and vinyl functionality illustrated in Formula (6) is prepared as a reaction product of the silanol terminated polyorganosiloxane of Formula (2) and the silane coupling agent of Formula (7), where $R_4$ in Formula (7) is defined as above with respect to Formula (6). This reaction is carried out in the presence of a condensation catalyst such as an organotin chelate.

In a still further embodiment of the invention, the second polysiloxane component can be either a vinylmethylsiloxane copolymer, which is trimethyl terminated and wherein the vinyl functionality is pendent to the polysiloxane backbone, or a dimethylvinyl terminated polydimethylsiloxane. In both instances there is no alkoxy functionality. The aforementioned vinylmethylsiloxane copolymers and the vinyl terminated siloxanes are both commercially available and their preparation as such is not within the scope of the present invention. These compounds range in viscosity from just under 100 cps to over 1,000,000 cps with percent vinyl contents ranging from less than 0.02% to over 10% by weight.

The preferred method of preparing the dual-cure silicone composition from the first and second polysiloxane components will now be described.

The first polysiloxane component is combined with the second polysiloxane component in a stoichiometric ratio as determined by the individual equivalent weight of each of these components. The equivalent weight of a molecule is defined as the molecular weight of the molecule divided by the number of functional groups in the molecule which facilitate or are involved in the UV-curing mechanism, also termed the effective functionality. For example, taking the first polysiloxane component of Formula (1) above, this molecule has a functionality of 2 owing to the 2 mercapto-groups, one at either end. Taking the second polysiloxane component of Formula (4), this molecule also has a functionality of 2, owing to the bi-vinyl terminal functionality. Therefore, each of these molecules would have an equivalent weight equal to one-half its molecular weight (its molecular weight divided by 2). Once the values for the equivalent weights of each of these molecules is calculated, the respective molecules are combined or mixed together to provide a dual-cure silicone polymer composition according to the invention in a weight ratio based on their respective equivalent weights. For example, if it is determined that the first polysiloxane component has an equivalent weight of 5000 g/mol-funct. and the second polysiloxane component has an equivalent weight of 100 g/mol-funct., then the first and second polysiloxane components are combined in a weight ratio of 5000:100 (or 50:1) in order to provide a 1:1 ratio between mercapto groups in the first polysiloxane component and vinyl groups in the second polysiloxane component. The objective is to have an equal number of mercapto and vinyl groups in the respective first and second polysiloxane components to facilitate optimal cross-linking once the UV-initiated curing reaction proceeds; i.e. it is desirable to have a 1:1 stoichiometric ratio between vinyl and mercapto groups to achieve optimum curing performance. Less preferably, vinyl:mercapto stoichiometric ratios in the range of 0.9:1 to 1.1:1, less preferably 0.7:1 to 1.3:1, less preferably 0.5:1 to 1.5:1, will provide a final dual-cure silicone compound that exhibits suitable elasticity, and whose precursor uncured composition exhibits satisfactory curing performance. If stoichiometric excesses of mercapto- and vinyl-functional species are used in preparing the first and second polysiloxane components respectively, and the residual excesses have not been removed from the respective compositions, then these excess mercapto- and vinyl-functional groups must be taken into account when calculating equivalent weight because these species will react and become crosslinked with the respective first and second polysiloxane components in the dual-cure composition once the UV-curing mechanism has been initiated.

Molecular weights of polyorganosiloxane polymers (such as those from which the first and second polysiloxane components are made) generally are reported as averages and can vary significantly within a product specification. Therefore, while the preferred stoichiometric blend ratio of the first and second polysiloxane components may be calculated based on their theoretical equivalent weights as described above, the blend ratio is most often calculated via more empirical methods using the theoretical values based on the reported molecular weights as guidelines.

Once the correct blend ratio between the first and second polysiloxane components is determined, the dual-cure silicone composition according to the invention is made by mixing these components in the correct ratio together with a photoinitiator and a moisture-cure catalyst. The photoinitiator can be provided as a mixture or blend of photoinitiator species. Under most circumstances a blended photoinitiator package is preferred. Combined photoinitiator concentrations will preferably be in the range of 0.1% to 5.0% by weight of the total dual-cure silicone composition; however, depending on the particular properties of the selected material, amounts outside of the given range such as down to 0.4%, 0.3% or 0.2%, or up to 6%, 7%, 8%, 9% or 10%, based on the total weight of the silicone composition can be employed. The photoinitiator supplies or initiates the primary UV-curing crosslinking mechanism in the silicone composition. Selection of the correct photoinitiator or photoinitiator blend is critical in the dual-cure silicone composition. It is believed the UV-curing reaction mechanism in the dual-cure silicone composition proceeds through a free radical propagation and addition format as illustrated below.

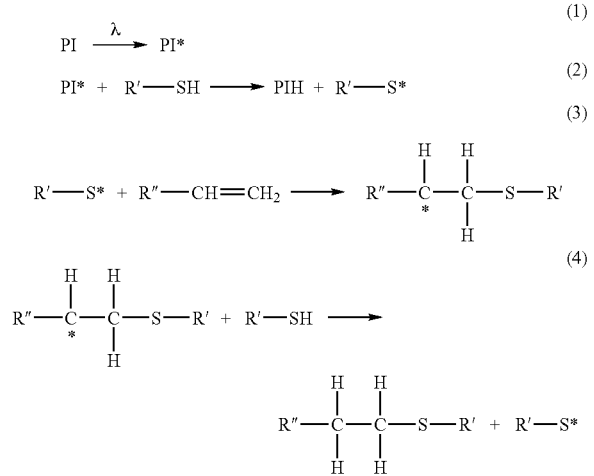

Where: PI = Photoinitiator
* = Free radical
λ = UV radiation

Therefore, any photoinitiator which generates free radicals on exposure to UV radiation may be acceptable for preparing the silicone compositions according to the invention. In selecting a proper photoinitiator package one must consider many variables such as: application thickness, UV lamp type and orientation, cure speed requirements, pigmentation level, etc. The specific chemical structure of any selected photoinitiator will determine the activation energy (that is, the associated wavelength of UV radiation) which will stimulate the molecules thereby generating free radicals and initiating the cross-linking or curing cascade. Matching the photoinitiator activation energy to the function and exposure conditions for a particular application is important to achieve a dual-cure silicone composition that will cure properly in that application. Longer wavelength ultraviolet radiation, in the near visible region above 430 nanometers, penetrates deeper into the lower, more distal region of a coating; shorter wavelengths, around 230 nanometers, provide higher energy photons but they do not penetrate as deeply. Generally, for conformal coatings and unpigmented systems, photoinitiators from the alpha hydroxyketone family are preferred. For deep region through cure and highly pigmented systems a bis-acylphosphine oxide (BAPO) type photoinitiator is preferred.

The catalyst which promotes the moisture-activated curing mechanism can be any of the methoxy-silicone moisture curing catalysts, which are known in the art and that do not adversely affect the UV cure based on the moisture-activated mechanism. The higher the concentration of the catalyst the faster the system will cure. Thus, the cure speed may be adjusted to meet the needs of the application. Typically, the catalyst concentration is from 0.1% to 5% based upon the amount of silicones.

The dual-cure silicone composition having the first and second polysiloxane components in the specified ratio and the photoinitiator exhibits a very rapid UV-curing mechanism compared to conventional dual-cure silicones. Without wishing to be bound to a particular theory, the relative speed of the UV-curing mechanism of the inventive compositions is believed to be attributable to the highly reactive mercapto groups effectively scavenging generated free radicals to propagate the UV-initiated crosslinking cascade much faster than the free radicals can be consumed by other present reactive species such as atmospheric oxygen. Conversely, conventional dual-cure silicones employ an acrylic terminated siloxane to scavenge the photoinitiator-generated free radicals and provide the UV-curing mechanism. Acrylic groups are not nearly as reactive as the mercapto groups used in the inventive composition, making the entire UV-curing mechanism in conventional silicones extremely oxygen-sensitive. In the composition according to the invention, the mercapto groups scavenge generated free radicals at a much higher rate than the radicals can be taken up by atmospheric oxygen and the UV-curing mechanism propagates at a highly increased rate compared to the poor performance of conventional acrylic terminated siloxanes used for this purpose.

Optionally, additional ingredients that are known or conventional in the art can be added to the dual-cure silicone composition in conventional amounts, so long as the additional ingredients do not interfere with either the UV-activated, or the moisture-activated curing mechanisms. Such additional ingredients can be selected by persons of ordinary skill in the art without undue experimentation to achieve desired properties. Optional ingredients may include fillers, both reinforcing and semi-reinforcing varieties that are used to modify the rheology, improve the final physical properties (i.e., hardness, tensile strength, etc.) and reduce the cost. Suitable fillers may be selected from a long list of materials that are known to those skilled in the art such as, silica, talc, calcium carbonate among others. Further examples of acceptable fillers may be found in U.S. Pat. No. 4,072,635. Loading levels for fillers are preferably 5–20 weight percent, but can be higher, up to 40 or 50 or 60 or 70 weight percent. At higher filler loading levels the depth of cure is reduced and the resulting films are typically thinner. Other optional ingredients include but are not limited to the following: adhesion promoters, such as tris-[3-(trimethoxysilyl)propyl] isocyanurate, or 2,3-epoxypropyl silane; plasticizers such as, alkylbenzene derivatives, or trimethylsilyl terminated polyorganosiloxanes; pigments; stabilizers or other compounding aids as necessary to achieve desired product characteristics.

In the compositions according to the invention, the above-described mercapto-based UV curing mechanism is combined with an oximo- or oximino-based ($-OR_4$) water curing mechanism promoted by the moisture-curing catalyst. The combination of these two curing mechanisms is novel in the art, and provides a dual-cure silicone composition exhibiting a very rapid UV-initiated crosslinking cascade compared to conventional compositions. Both the UV- and water-initiated curing mechanisms can and preferably do operate simultaneously, for example on exposure to both UV radiation and moisture, however crosslinking from the UV mechanism proceeds at a highly accelerated rate (several seconds to several minutes) compared to crosslinking from the water mechanism (several hours to several days). The UV curing mechanism provides a finished cured product compound (e.g. potting compound) that is dimensionally stable and rigid almost immediately following exposure to UV radiation. The water curing mechanism proceeds simultaneously to crosslink the composition in regions that are not exposed to UV at all, or which are shielded from direct exposure to the UV radiation, e.g. because they are in the shadow of a protruding component in the line of sight to the UV source.

Dual-cure silicone compositions prepared as described above cure very rapidly on exposure to ultra-violet radiation based on the UV-initiated curing mechanism. Most preferably, a layer of a dual-cure silicone composition made as described herein and having a uniform total thickness of at least 0.1, preferably 0.2, preferably 0.3, preferably 0.4, preferably 0.5, inches, exhibits at least 70, preferably 80, preferably 90, preferably 94, preferably 96, preferably 98, preferably 99, percent total curing, based on the UV-initiated curing mechanism, following two seconds of exposure to direct UV radiation having an average UV intensity of 151–185, preferably 151, $mW/cm^2$ measured at the surface of the layer. Of course, additional curing based on the moisture-initiated mechanism will be achieved as well, even in the regions where UV-curing has been achieved, though the moisture curing mechanism typically proceeds much more slowly, often taking days to be completed. The dual-cure silicone compounds of the invention exhibit substantially improved elastomeric properties compared to conventional dual-cure silicone materials, and their precursor compositions also exhibit rapid UV curing. This makes the compounds according to the invention highly suitable for use as encapsulating or potting compounds where it is desired to dampen vibration or shock that otherwise might be experienced by a delicate electronic component.

In practice, the uncured composition is prepared as described above (preferably comprising the first and second polysiloxane components, the photoinitiator and the moisture curing catalyst) to provide a viscous flowable material that is suitable for coating electronic or other components. Once the electronic or other component has been suitably coated with the uncured composition, the curing mechanisms are initiated as described above to crosslink the composition and provide the finished encapsulating/potting compound or layer. Most preferably the uncured composition is sufficiently applied so that the cured layer completely or substantially completely encapsulates the electronic or other component therein, thereby providing a damping/shielding encapsulation.

Electronic components have been coated with an encapsulating layer of the uncured dual-cure silicone composition according to the invention, and then conveyed past a stationary UV radiation source (to cure the compound) at line speeds in excess of 30 meters/minute, with average UV intensity of 151 $mW/cm^2$, which has been determined to be sufficient to affect full UV-curing throughout the composition to produce the resultant silicone compound.

The silicone compositions according to the invention cure to a slightly softer, more elastic state when not exposed to UV light and are only allowed to moisture cure; materials that are UV cured first will continue to gain hardness and toughness as the moisture curing mechanism proceeds until completion. Once both the UV- and moisture-curing mechanisms are completed, the resulting compounds retain substantial elasticity and will not age harden significantly on prolonged storage.

It will be understood the ultimate physical properties of silicone compounds made according to the invention will depend on numerous variables including: the molecular weight of the first and second polysiloxane components, filler loading, plasticizer content, as well as cure conditions. Through skilled application and formulating techniques, a full range of physical properties, particularly elasticity, may be achieved by persons of ordinary skill in the art without undue experimentation. The following examples are provided such that persons skilled in the art may better understand the practice of the current invention. These examples are illustrative only and are not intended to limit the scope, or restrict the applications of the present invention.

EXAMPLES

Example 1

Prepare Stage 1 as follows: into a 4500 cc flat bottom, stainless steel, planetary mixer weigh 450.0 gm of a silanol terminated polydimethylsiloxane of 5000 cst viscosity, 425.0 gm of a silanol terminated polydimethylsiloxane of 100 cst viscosity, and 50.0 gm of a double-treated fumed silica. Mix under vacuum (approximately 28 inches or 710 mm of Hg) for 25–30 minutes. Add 55.0 gm of vinyltrimethoxy silane and mix under vacuum for an additional 10–15 minutes. In a separate container mix 10.0 gm of bis(ethyl acetoacetato) diisopropoxy titanium catalyst (Tyzor® DC, Dupont) with 10.0 gm of tris-[3-(trimethoxysilyl)propyl]isocyanurate. Add to the above listed ingredients and allow the entire contents to mix under vacuum for 30–45 minutes. Remove the sample from the mixer and store under substantially anhydrous conditions while the second stage is prepared.

Into a 4500 cc flat bottom, stainless steel, planetary mixer weigh 600.0 gm of a silanol terminated polydimethylsiloxane of 100 cst viscosity, 57.2 gm of gamma-mercaptopropyltrimethoxy silane, and 8.8 gm of bis(ethyl acetoacetato) diisopropoxy titanium catalyst (Tyzor® DC, Dupont). Allow to mix for 4–5 hours under vacuum. Periodically monitor the viscosity of the mixture using a Brookfield Model LVT viscometer equipped with a #2 spindle operating at 25 rpm. The measured viscosity should be a least 200 cst before proceeding to the subsequent stages. Add 555.0 gm of the mixture obtained from Stage 1 above, and 20.0 gm of a pre-blended free-radical photoinitiator Irgacure® 2020 from Ciba Specialty Chemicals, Tarrytown, N.Y. Mix for a final 15–20 minutes under vacuum. Remove the sample from the mixer and store under substantially anhydrous conditions excluded from UV light exposure until used.

Example 2

Into a 4500 cc flat bottom, stainless steel, planetary mixer weigh 600.0 gm of a silanol terminated polydimethylsiloxane of 100 cst viscosity, 57.2 gm of gamma-mercaptopropyltrimethoxy silane, and 8.8 gm of bis(ethyl acetoacetato) diisopropoxy titanium catalyst (Tyzor® DC, Dupont). Allow to mix for 4–5 hours under vacuum. Periodically monitor the viscosity of the mixture using a Brookfield Model LVT viscometer equipped with a #2 spindle operating at 25 rpm. The viscosity should be a least 200 cst before proceeding to the subsequent stages. Remove the sample from the mixer and store under substantially anhydrous conditions while the second stage is prepared.

Into a 4500 cc flat bottom, stainless steel, planetary mixer weigh 875.0 gm of a silanol terminated polydimethylsiloxane of 5000 cst viscosity, and 50.0 gm of a treated fumed silica. Mix under vacuum (approximately 28 inches of Hg) for 25–30 minutes, once the mixture is substantially degassed, add 10.0 gm of vinyltrimethoxy silane and mix under vacuum for an additional 30–45 minutes. Add 213.6 gm of the mercapto terminated material from the above mix, and stir under vacuum for a final 15–20 minutes. Remove the sample from the mixer and store under substantially anhydrous conditions excluded from UV light exposure until used.

Example 3

Into a 4500 cc flat bottom, stainless steel, planetary mixer weigh 540.5 gm of a silanol terminated polydimethylsiloxane of 100 cst viscosity, 51.5 gm of gamma-mercaptopropyltrimethoxy silane, and 8.0 gm of bis(ethyl acetoacetato) diisopropoxy titanium catalyst (Tyzor® DC, Dupont). Allow to mix for 4–5 hours under vacuum. Periodically monitor the viscosity of the mixture using a Brookfield Model LVT viscometer equipped with a #2 spindle operating at 25 rpm. The measured viscosity should be a least 200 cst before proceeding to the subsequent stages. Add 1200.0 gm of a commercial grade, vinyl terminated silicone polymer of 1000 cst viscosity and approximate 0.20 weight percent vinyl content (Masil 201 from BASF), 17.9 gm of an alkylbenzene plasticizer (Progilene 450 from Shrieve Chemical Products, Woodland, Tex.), and 31.5 gm of a pre-blended free-radical photoinitiator Irgacure® 2020 from Ciba Specialty Chemical, Tarrytown, N.Y. Mix for a final 15–20 minutes under vacuum. Remove the sample from the mixer and store under substantially anhydrous conditions excluded from UV light exposure until used.

Example 4

Using a Hauschild Model DAC 150 Speed Mixer™ blend 60.0 gm of the dual-cure silicone composition obtained from Example 1 with 25.0 gm of a ultra-fine, stearate-treated, precipitated calcium carbonate of 0.04–0.07 µm mean particle size, and 5.0 gm of a surface-treated fumed silica.

Films of this composition were cast onto Teflon® molds at 1.5 mm thickness. The material was then irradiated for 3.0 seconds at an average UV intensity of 185 mW/cm$^2$, and then allowed to moisture cure for 7 days at 50% relative humidity and 25° C. Tensile and elongation properties were determined per the methods and procedures outlined in ASTM D-412. Results are given in Table 1.

TABLE 1

| Tensile Strength kPa (psi) | 1.75 (255) |
|---|---|
| Elongation (%) | 35 |

Example 5

Using a Hauschild Model DAC 150 Speed Mixer™ blend 50.0 gm of the dual-cure silicone composition obtained from Example 2 with 10.0 gm of an ultra-fine, stearate-treated, precipitated calcium carbonate of 0.04–0.07 µm mean particle size, 25.0 gm of a crystalline silica, 10.0 gm of an alkylbenzene derivative (Progilene 450), and 1.0 gm of Irgacure® 2020.

Films of this composition were cast onto Teflon® molds at 1.5 mm thickness. The material was then irradiated for 3.0 seconds at an average UV intensity of 185 mW/cm$^2$, and then allowed to moisture cure for 7 days at 50% relative humidity and 25° C. Tensile and elongation properties were determined per the methods and procedures outlined in ASTM D-412 Results are given in Table 2.

TABLE 2

| Tensile Strength kPa (psi) | 1.64 (240) |
|---|---|
| Elongation (%) | 40 |

The dual-cure silicone compounds according to the invention exhibit vastly improved elastomeric properties compared to conventional dual-cure silicones. A compound according to the invention has a tensile strength of at least 1, preferably 1.1, preferably 1.2, preferably 1.3, preferably 1.4, preferably 1.5, preferably 1.6, preferably 1.7, preferably 1.8, preferably 1.9, preferably 2, kPa, and exhibits a percent elongation at break of about or at least 15, preferably 20, preferably 25, preferably 30, preferably 35, preferably 40, preferably 45, preferably 50, percent depending on the application. It will be understood from the present disclosure that the composition of compounds according to the invention can be tuned to provide an elastomeric material having the desired elastic properties; larger molecular weight polysiloxane components result in more elastic cured compounds, while lower molecular weight polysiloxane components result in less elastic, more rigid cured compounds. In addition, uncured-composition viscosity increases with increased molecular weight of the polysiloxane components, which can make it difficult to uniformly apply the uncured composition if viscosity becomes too high. Usually, selection of the first and second polysiloxane components having suitable viscosities will be made by a person of ordinary skill in the art to balance these competing factors based on the intended application; such selection is within the competence of a person of ordinary skill in the art without undue experimentation.

Examples 6–10

To examine the effects of various photoinitiator combinations, compositions were prepared as indicated in Table 3 using a Hauschild Model DAC 150 Speed Mixer™; where the numerical entries represent weight percents, the resin is taken as the dual-cure silicone composition prepared in Example 2 above, and the different photoinitiators labeled A–D are as follows: A=Irgacure® 2020 as described in Example 1, B=50% Benzophenone, 50% 1-Hydroxy cyclohexyl phenyl ketone, C=2,2-Diethoxyacetophenone, and D=2-Hydroxy-2-methyl-1-phenyl propanone. Each Example was cast to a film thickness of 0.375 inches.

TABLE 4

| Example Number | Residence Time (seconds)/ Exposure Conditions |
|---|---|
| 6 | 0.30/185 mW/cm$^2$ |
| 7 | 0.30/185 mW/cm$^2$ |
| 8 | 1.20/185 mW/cm$^2$ |
| 9 | 0.30/185 mW/cm$^2$ |
| 10 | 1.20/185 mW/cm$^2$ |

With regard to Examples 6–10, after the indicated amount of UV exposure, each Example was evaluated for through cure and it was determined that each Example was cured through the full depth.

Example 11

As an additional example, Table 5 is presented outlining various components and their respective preferred and less preferred weight percents which can be mixed or compounded together in a single vessel to provide a dual-cure silicone composition according to the invention. Based on the foregoing disclosure, a person of ordinary skill in the art will recognize that the following mixture of components will yield a mixture of the first and second polysiloxane components as described above for the dual-cure composition, together with such other components as a water curing catalyst and a photoinitiator. The components in Table 5 may be combined in the indicated preferred and less preferred weight percents to yield an example of the formulation of the present invention. In addition, alternative or substitute ingredients mentioned elsewhere in this patent application can be substituted for the ingredients listed in Table 5 by a person of ordinary skill in the art.

TABLE 5

| Ingredient | Preferred Weight Percent | Less Preferred Weight Percent | Less Preferred Weight Percent | Less Preferred Weight Percent | Less Preferred Weight Percent |
|---|---|---|---|---|---|
| 5000 cps silanol-terminated polysiloxane | 31.11 | 31–32 | 25–35 | 20–40 | 15–50 |
| Treated fumed silica[1] | 5.42 | 5–6 | 4–10 | 3–15 | 2–16 |
| 100 cps silanol-terminated polysiloxane | 16.94 | 16–18 | 12–30 | 8–40 | 4–50 |
| Vinyl tri-oximosilane | 4.44 | 4–5 | 3–8 | 2–10 | 1–12 |
| Dibutyl tin dilaurate | 0.08 | 0.07–0.12 | 0.05–0.30 | 0.03–0.60 | 0.01–0.90 |
| 1000 cps vinyl-terminated polysiloxane[2] | 19 | 15–22 | 12–27 | 8–35 | 3–45 |
| 100 cps mercapto-terminated polysiloxane[3] | 22 | 19–25 | 14–32 | 9–40 | 3–50 |
| 2-hydroxy-2-methyl-1-phenyl propanone | 1 | 0.9–2 | 0.7–3 | 0.4–4 | 0.1–5 |

TABLE 3

| Example | Resin Content | A | B | C | D |
|---|---|---|---|---|---|
| 6 | 98.0 | 2.0 | — | — | — |
| 7 | 95.0 | 5.0 | — | — | — |
| 8 | 95.0 | — | 5.0 | — | — |
| 9 | 97.3 | — | — | 2.7 | — |
| 10 | 98.0 | — | — | — | 2.0 |

Treated fumed silica, indicated by superscript 1, is available as product number H2000 from Wacker Chemical Corporation. The treated fumed silica is provided as a filler material. Vinyl terminated polysiloxane, indicated by superscript 2, is available as product Masil 201 from BASF Corporation. Mercapto terminated polysiloxane, indicated by superscript 3, is available as product KF 2001 from Shin-Etsu Chemical Co., Ltd.

Example 12

As an additional example, Table 6 is presented outlining various components and their respective preferred and less preferred weight percents which can be mixed or compounded together in a single vessel to provide a dual-cure silicone composition according to a further embodiment of the invention. The components in Table 6 may be combined in the indicated preferred and less preferred weight percents to yield an example of the formulation of the present invention. In addition, alternative or substitute ingredients mentioned elsewhere in this patent application can be substituted for the ingredients listed in Table 6.

TABLE 6

| Ingredient | Preferred Weight Percent | Less Preferred Weight Percent | Less Preferred Weight Percent | Less Preferred Weight Percent | Less Preferred Weight Percent |
|---|---|---|---|---|---|
| 20,000 cps silanol-terminated polysiloxane | 34 | 33–35 | 28–38 | 23–43 | 18–53 |
| Treated fumed silica[1] | 6.33 | 6–7 | 5–10 | 4–13 | 2–16 |
| Treated fumed silica[4] | 5 | 4–6 | 3–10 | 2.5–13 | 2–16 |
| 100 cps silanol-terminated polysiloxane | 10 | 8–12 | 6–18 | 4–25 | 2–40 |
| Vinyl tri-oximosilane | 3.67 | 3–4 | 2–7 | 1–9 | 0.5–10 |
| Dibutyl tin dilaurate | 0.06 | 0.05–0.10 | 0.03–0.28 | 0.02–0.58 | 0.01–0.90 |
| 1000 cps vinyl-terminated polysiloxane[5] | 19.93 | 15–22 | 12–27 | 8–35 | 3–45 |
| 100 cps mercapto-terminated polysiloxane[3] | 20 | 17–23 | 12–30 | 8–38 | 3–48 |
| 2-hydroxy-2-methyl-1-phenyl propanone | 1 | 0.9–2 | 0.7–3 | 0.4–4 | 0.1–5 |

Treated fumed silica, indicated by superscript 1, is available as product number H2000 from Wacker Chemical Corporation. Treated fumed silica, indicated by superscript 4, is available as product H15 from Wacker Chemical Corporation. Again, the treated fumed silica components are filler materials, and the combination of fumed silicas disclosed in this Example have proven to be quite effective in the present invention. Vinyl terminated polysiloxane, indicated by superscript 5, is available as product VF1000 from Shin-Etsu Chemical Co., Ltd. Mercapto terminated siloxane, indicated by superscript 3, is available as product KF 2001 from Shin-Etsu Chemical Co., Ltd.

Although the invention has been described with respect to preferred embodiments, it will be understood that various modifications can be made thereto without departing from the spirit and the scope of the invention as embodied in the appended claims.

What is claimed is:

1. A dual-cure silicone composition comprising a first polysiloxane component and a second polysiloxane component, said first polysiloxane component being a polyorganosiloxane having terminal mercapto functionality, said second polysiloxane component being a polyorganosiloxane having terminal vinyl and oximo functionality, wherein the terminal vinyl functionality of said second polysiloxane component is not provided in the form of a (meth)acrylic group.

2. A dual-cure silicone composition according to claim 1, said second polysiloxane component having the structure:

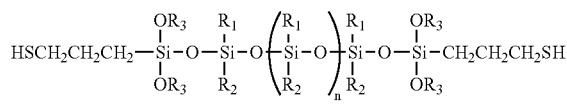

wherein $R_1$ and $R_2$ each is an organo group, $R_4$ is of the form $-N=CR_5R_6$ such that the $O-R_4$ linkage creates an oximine ($O-N=<$) structure and n is greater than or equal to zero.

3. A dual-cure silicone composition according to claim 2, wherein $R_5$ and $R_6$ each is a low order alkyl moiety.

4. A dual-cure silicone composition according to claim 2, wherein $R_5$ is methyl and $R_6$ is ethyl.

5. A dual-cure silicone composition according to claim 2, wherein n for said second polysiloxane component is greater than about 50.

6. A silicone composition according to claim 1, said first polysiloxane component being dimethylmercapto terminated polydimethylsiloxane.

7. A dual-cure silicone composition according to claim 1, said first polysiloxane component also having terminal alkoxy functionality.

8. A dual-cure silicone compound according to claim 1, said first polysiloxane component having the following structure:

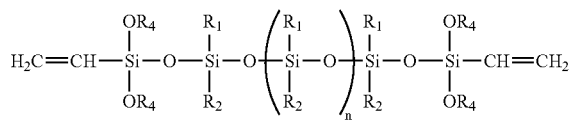

wherein $R_1$, $R_2$ and $R_3$ each is separately selected from the group consisting of organo groups and n is greater than or equal to zero.

9. A dual-cure silicone composition according to claim 8, wherein n for said first polysiloxane component is greater than about 50.

10. A silicone composition according to claim 1, further comprising at least one of a) a vinylmethylsiloxane copolymer that is trimethyl terminated and having vinyl functionality pendent to the polymer backbone, or b) a dimethylvinyl terminated polydimethylsiloxane.

11. A dual-cure silicone composition according to claim 1, said first polysiloxane component having terminal mercapto functionality at both ends thereof.

12. A dual-cure silicone composition according to claim 1, said second polysiloxane component having terminal vinyl and oximo functionality at both ends thereof.

13. A dual-cure silicone composition according to claim 1, further comprising a photoinitiator.

14. A dual-cure silicone composition according to claim 1, further comprising a water curing catalyst.

15. A dual-cure silicone composition according to claim 8, said second polysiloxane component having the structure:

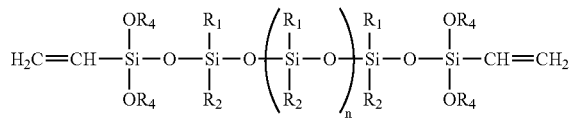

wherein $R_1$ and $R_2$ each is an organo group, $R_4$ is of the form $-N=CR_5R_6$ such that the $O-R_4$ linkage creates an oximine ($O-N=C\ <$) structure and n is greater than or equal to zero.

16. A dual-cure silicone composition according to claim 15, wherein $R_5$ and $R_6$ each is a low order alkyl moiety.

17. A dual-cure silicone composition according to claim 15, wherein $R_5$ is methyl and $R_6$ is ethyl.

18. A dual-cure silicone composition according to claim 15, wherein n for both said first and second polysiloxane components is greater than 50.

19. A dual-cure silicone composition according to claim 15, wherein n is substantially the same for both said first and said second polysiloxane components.

20. A dual-cure silicone composition according to claim 1, said first and second polysiloxane components being present in a nominal equivalent weight ratio of 1:1.

21. A dual-cure silicone composition according to claim 1, said first and second polysiloxane components being present in a nominal equivalent weight ratio in the range of 0.7:1 to 1.3:1.

22. A dual-cure silicone composition according to claim 21, wherein the equivalent weight ratio between said first and second polysiloxane components is calculated taking account of any residual excesses of mercapto-functional and vinyl-functional silanes still present in the composition, which were used in preparing the respective first and second polysiloxane components.

23. A dual-cure silicone composition according to claim 1, further comprising a plasticizer.

24. A dual-cure silicone composition according to claim 1, said composition being effective such that a layer of said composition having a uniform total thickness of 0.1 inches exhibits at least 70 percent total curing, based on a UV-initiated curing mechanism, following two seconds of exposure to direct UV radiation having an average UV intensity of 151–185 $mW/cm^2$ measured at the surface of the layer.

25. A dual-cure silicone composition according to claim 1, said compound being effective to produce an elastomeric compound on curing said composition.

26. A dual-cure silicone composition according to claim 1, said composition exhibiting both a UV-initiated crosslinking mechanism and a moisture-initiated crosslinking mechanism, wherein a layer of said composition having a uniform total thickness of 0.1 inches exhibits at least 70 percent total curing, based on the UV-initiated curing mechanism, following two seconds of exposure to direct UV radiation having an average UV intensity of 151–185 $mW/cm^2$ measured at the surface of the layer.

27. A dual-cure silicone composition according to claim 26, wherein a layer of said composition having a uniform total thickness of 0.4 inches exhibits at least 90 percent total curing, based on the UV-initiated curing mechanism, following two seconds of exposure to direct UV radiation having an average UV intensity of 151–185 $mW/cm^2$ measured at the surface of the layer.

* * * * *

UNITED STATES PATENT AND TRADEMARK OFFICE
CERTIFICATE OF CORRECTION

| | | |
|---|---|---|
| PATENT NO. | : 7,105,584 B2 | Page 1 of 1 |
| APPLICATION NO. | : 10/823942 | |
| DATED | : September 12, 2006 | |
| INVENTOR(S) | : Brian R. Chambers et al. | |

It is certified that error appears in the above-identified patent and that said Letters Patent is hereby corrected as shown below:

IN THE CLAIMS:

In claim 2, column 18, line 3, after the word "oximine", please delete the formula "(O–N=<)" and insert the formula -- (O–N=C<) --

Signed and Sealed this

First Day of May, 2007

JON W. DUDAS
*Director of the United States Patent and Trademark Office*